US010003999B2

(12) United States Patent
Chen et al.

(10) Patent No.: US 10,003,999 B2
(45) Date of Patent: Jun. 19, 2018

(54) HTTP-BASED BUFFER STATUS UPDATING METHOD AND DEVICE, AND BUFFER STATUS PROCESSOR

(71) Applicant: Huawei Technologies Co., Ltd., Shenzhen (CN)

(72) Inventors: Bing Chen, Shenzhen (CN); Shan Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 99 days.

(21) Appl. No.: 15/248,603

(22) Filed: Aug. 26, 2016

(65) Prior Publication Data

US 2016/0366617 A1  Dec. 15, 2016

Related U.S. Application Data

(63) Continuation of application No. PCT/CN2014/088370, filed on Oct. 11, 2014.

(30) Foreign Application Priority Data

May 22, 2014 (CN) .......................... 2014 1 0218849

(51) Int. Cl.
*H04L 12/58* (2006.01)
*H04W 28/14* (2009.01)
(Continued)

(52) U.S. Cl.
CPC .............. *H04W 28/14* (2013.01); *H04L 29/08* (2013.01); *H04L 43/16* (2013.01); *H04L 47/30* (2013.01);
(Continued)

(58) Field of Classification Search
USPC ......................................... 370/252, 395, 329
See application file for complete search history.

(56) References Cited

U.S. PATENT DOCUMENTS

2002/0097842 A1    7/2002  Guedalia et al.
2012/0096083 A1    4/2012  Teng et al.
(Continued)

FOREIGN PATENT DOCUMENTS

CN    101127989 A    2/2008
CN    101212399 A    7/2008
(Continued)

OTHER PUBLICATIONS

Machine Translation and Abstract of Chinese Publication No. CN101127989, Feb. 20, 2008, 11 pages.
(Continued)

*Primary Examiner* — Zewdu A Beyen
(74) *Attorney, Agent, or Firm* — Conley Rose, P.C.

(57) ABSTRACT

A Hypertext Transfer Protocol (HTTP)-based buffer status updating method, device and a buffer status processor are provided, where the method includes, receiving an HTTP request from a terminal, triggering a buffer event according to the HTTP request, where the buffer event includes seek, pause, resume, and stream switch, and the method further includes updating a buffer status according to the buffer event, where the buffer status includes a normal play state, a play paused state, a re-buffering state, and a stream switch state. Hence, the buffer status is updated based on the buffer event in a manner of analyzing only an HTTP Protocol field such that a buffer model is closer to a real client buffer situation.

17 Claims, 7 Drawing Sheets

(51) Int. Cl.
- *H04L 29/08* (2006.01)
- *H04L 12/26* (2006.01)
- *H04W 28/02* (2009.01)
- *H04N 21/6587* (2011.01)
- *H04L 12/835* (2013.01)
- *H04L 12/931* (2013.01)
- *H04L 29/06* (2006.01)

(52) U.S. Cl.
CPC ......... *H04L 65/80* (2013.01); *H04N 21/6587* (2013.01); *H04W 28/0278* (2013.01); *H04L 49/355* (2013.01); *H04L 65/4084* (2013.01); *H04L 65/608* (2013.01); *H04L 69/16* (2013.01)

(56) References Cited

U.S. PATENT DOCUMENTS

| | | | |
|---|---|---|---|
| 2012/0254456 | A1 | 10/2012 | Visharam et al. |
| 2013/0028118 | A1 | 1/2013 | Cherian et al. |
| 2013/0343222 | A1* | 12/2013 | Chen .................. H04L 41/5038 370/252 |
| 2014/0019587 | A1 | 1/2014 | Giladi |
| 2014/0108497 | A1 | 4/2014 | Yao et al. |

FOREIGN PATENT DOCUMENTS

| | | |
|---|---|---|
| CN | 101282348 A | 10/2008 |
| CN | 102025760 A | 4/2011 |
| CN | 102118270 A | 7/2011 |
| CN | 102333089 A | 1/2012 |
| CN | 102740159 A | 10/2012 |
| CN | 102868908 A | 1/2013 |
| CN | 103428105 A | 12/2013 |
| CN | 103797873 A | 5/2014 |

OTHER PUBLICATIONS

Machine Translation and Abstract of Chinese Publication No. CN101212399, Jul. 2, 2008, 8 pages.
Machine Translation and Abstract of Chinese Publication No. CN101282348, Oct. 8, 2008, 7 pages.
Machine Translation and Abstract of Chinese Publication No. CN103428105, Dec. 4, 2013, 17 pages.
Foreign Communication From a Counterpart Application, Chinese Application No. 201410218849.6, Chinese Search Report dated Nov. 13, 2017, 2 pages.
Foreign Communication From a Counterpart Application, Chinese Application No. 201410218849.6, Chinese Office Action dated Nov. 17, 2017, 4 pages.
Machine Translation and Abstract of Chinese Publication No. CN102333089, Jan. 25, 2012, 6 pages.
"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 10)," 3GPP TS 26.247, V10.1.0, Technical Specification, Nov. 2011, 111 pages.
Foreign Communication From a Counterpart Application, PCT Application No. PCT/CN2014/088370, English Translation of International Search Report dated Feb. 27, 2015, 3 pages.
Foreign Communication From a Counterpart Application, PCT Application No. PCT/CN2014/088370, English Translation of Written Opinion dated Feb. 27, 2015, 15 pages.

* cited by examiner

HTTP-BASED BUFFER STATUS UPDATING METHOD AND DEVICE, AND BUFFER STATUS PROCESSOR

CROSS-REFERENCE TO RELATED APPLICATIONS

This application is a continuation of International Application No. PCT/CN2014/088370, filed on Oct. 11, 2014, which claims priority to Chinese Patent Application No. 201410218849.6, filed on May 22, 2014, both of which are hereby incorporated by reference in their entireties.

TECHNICAL FIELD

The present disclosure relates to communication transmission technologies, and in particular, to a Hypertext Transfer Protocol (HTTP)-based buffer status updating method and device, and buffer status processor.

BACKGROUND

In audio and video applications of an Internet Protocol (IP) network, to smooth out impact brought from network transmission and implement synchronous play-out between a receiver and a transmitter, the receiver needs to temporarily store received audio and video data into a buffer in order to ensure that the audio and video data can still be played continuously after being transmitted using the IP network. A delay and a packet loss brought from a buffer need to be comprehensively considered in design of the buffer, an extremely small buffer may cause excessive packet losses, and an extremely large buffer may cause an extremely long play-out delay. It can be learned that a buffer status of the receiver directly affects audio and video play-out quality. Therefore, estimating the buffer status becomes extremely important for evaluation of the audio and video play-out quality.

The prior art mainly performs modeling for a buffer in a Real-Time Transport Protocol (RTP)/User Datagram Protocol (UDP) scenario in order to perform an operation, such as evaluating audio and video play-out quality by estimating a buffer status. At present, there are increasing audio and video applications based on the Transmission Control Protocol (TCP).

Currently, the audio and video applications of the IP network use the buffer on the receiver. The buffer may smooth out impact of a network jitter on the applications to a large extent, and therefore a representation of the buffer may reflect end-to-end performance of these applications.

To smooth out the impact brought from the network transmission and synchronize play-out between the transmitter and the receiver, the receiver needs to temporarily store the received data into the buffer. A main function of the buffer is to calculate a network jitter, and provide audio and video data according to a decoding need, and such a buffer is referred to as a de-jitter buffer, which ensures that audio and video data can still be played continuously after the network transmission. A delay and a packet loss brought from a buffer need to be comprehensively considered in design of the de-jitter buffer, an extremely small buffer may cause excessive packet losses, and an extremely large buffer may cause an extremely long play-out delay.

A terminal buffering status directly affects a result of a subjective quality evaluation, and modeling for various buffers is an indispensable step for the subjective quality evaluation.

A buffer event, such as seek, pause, resume, and stream switch, directly affects a buffering status. To update a buffer status accurately, the buffer event needs to be determined accurately.

In the prior art, the buffer event is determined using an audio/video data stream and a presentation time stamp (PTS). The pause occurs when no new audio/video data stream arrives, the resume occurs when a new audio/video data stream arrives after the pause occurs, and the seek occurs when a jump occurs on a PTS of the audio/video data stream.

In an existing method, to determine a buffer event using an audio/video data stream and a PTS, a media file needs to be parsed to obtain the PTS, which cannot be implemented or is extremely difficult to implement in real time in some cases, for example, when data is encrypted and there are mass users concurrently.

SUMMARY

In view of this, to resolve the foregoing problem, embodiments of the present disclosure provide an HTTP-based buffer status updating method. According to the buffer status updating method in the embodiments of the present disclosure, a buffer status is determined based on a buffer event in a manner of analyzing only an HTTP Protocol field such that a buffer model is closer to a real client buffer situation.

An embodiment of a first aspect of the present disclosure discloses an HTTP-based buffer status updating method, where the method includes receiving an HTTP request from a terminal, triggering a buffer event according to the HTTP request, where the buffer event includes seek, pause, resume, and stream switch, and updating a buffer status according to the buffer event, where the buffer status includes a normal play state, a play paused state, a re-buffering state, and a stream switch state.

According to the buffer status updating method in this embodiment of the present disclosure, a buffer status is updated based on a buffer event in a manner of analyzing only an HTTP Protocol field such that a buffer model is closer to a real client buffer situation.

With reference to the embodiment of the first aspect of the present disclosure, in a first possible implementation manner of the embodiment of the first aspect of the present disclosure, receiving an HTTP request from a terminal, and triggering a buffer event according to the HTTP request includes receiving a current GET request from the terminal, where a time at which the current GET request is received is t, and triggering the pause when no next GET request from the terminal is received within preset duration that starts from t, and correspondingly, updating a buffer status according to the buffer event includes setting the buffer status to the play paused state according to the pause.

With reference to the first possible implementation manner of the embodiment of the first aspect of the present disclosure, in a second possible implementation manner of the embodiment of the first aspect of the present disclosure, after triggering the pause, when a next GET request from the terminal is received, the method further includes triggering the resume according to the next GET request, and setting the buffer status to the normal play state according to the resume.

With reference to the second possible implementation manner of the embodiment of the first aspect of the present disclosure, in a third possible implementation manner of the embodiment of the first aspect of the present disclosure, the current GET request includes a current stream indicator, and the next GET request includes a next stream indicator, and the method further includes triggering the stream switch, and setting the buffer status to the stream switch state according to the stream switch after the next GET request from the terminal is received and when the current stream indicator is different from the next stream indicator.

With reference to any one of the foregoing possible implementation manners of the embodiment of the first aspect of the present disclosure, in a fourth possible implementation manner of the embodiment of the first aspect of the present disclosure, the method further includes determining, according to a keyword in the current GET request, whether to trigger the seek, and setting the buffer status to the re-buffering state according to the seek when it is determined to trigger the seek.

With reference to the fourth possible implementation manner of the embodiment of the first aspect of the present disclosure, in a fifth possible implementation manner of the embodiment of the first aspect of the present disclosure, determining, according to a keyword in the current GET request, whether to trigger the seek includes triggering the seek when a difference between a rang value in the current GET request and a range value in a previous GET request from the terminal is greater than a preset threshold.

With reference to the fourth possible implementation manner of the embodiment of the first aspect of the present disclosure, in a sixth possible implementation manner of the embodiment of the first aspect of the present disclosure, determining, according to a keyword in the current GET request, whether to trigger the seek includes triggering the seek when a difference between a ts_start value in the current GET request and a ts_start value in a previous GET request from the terminal is greater than a preset threshold and a difference between a ts_end value in the current GET request and a ts_end value in the previous GET request from the terminal is greater than the preset threshold.

With reference to the fourth possible implementation manner of the embodiment of the first aspect of the present disclosure, in a seventh possible implementation manner of the embodiment of the first aspect of the present disclosure, determining, according to a keyword in the current GET request, whether to trigger the seek includes triggering the seek when a difference between a begin value in the current GET request and a begin value in a previous GET request from the terminal is greater than a preset threshold.

With reference to the embodiment of the first aspect of the present disclosure, in an eighth possible implementation manner of the embodiment of the first aspect of the present disclosure, receiving an HTTP request from a terminal, and triggering a buffer event according to the HTTP request includes receiving a first GET request from the terminal, and triggering the seek according to a keyword in the first GET request, and correspondingly, updating a buffer status according to the buffer event includes setting the buffer status to the re-buffering state according to the seek.

With reference to the embodiment of the first aspect of the present disclosure, in a ninth possible implementation manner of the embodiment of the first aspect of the present disclosure, receiving an HTTP request from a terminal, and triggering a buffer event according to the HTTP request includes receiving a second GET request from the terminal, and triggering the resume according to the second GET request, and correspondingly, updating a buffer status according to the buffer event includes setting the buffer status to the normal play state according to the resume.

With reference to the embodiment of the first aspect of the present disclosure, in a tenth possible implementation manner of the embodiment of the first aspect of the present disclosure, receiving an HTTP request from a terminal, and triggering a buffer event according to the HTTP request includes receiving a third GET request from the terminal, where the third GET request includes a stream indicator, and triggering the stream switch when the stream indicator is different from a previous stream indicator from the terminal, and correspondingly, updating a buffer status according to the buffer event includes setting the buffer status to the stream switch state according to the stream switch.

An embodiment of a second aspect of the present disclosure discloses an HTTP-based buffer status updating device, where the device includes a receiving module configured to receive an HTTP request from a terminal, a trigger module configured to trigger a buffer event according to the HTTP request, and a buffer status module configured to update a buffer status according to the buffer event, where the buffer event includes seek, pause, resume, and stream switch, and the buffer status includes a normal play state, a play paused state, a re-buffering state, and a stream switch state.

According to the buffer status updating device in this embodiment of the present disclosure, a buffer status is updated based on a buffer event in a manner of analyzing only an HTTP Protocol field such that a buffer model is closer to a real client buffer situation.

With reference to the embodiment of the second aspect of the present disclosure, in a first possible implementation manner of the embodiment of the second aspect of the present disclosure, the receiving module is configured to receive a current GET request from the terminal, where a time at which the current GET request is received is t, the trigger module is configured to trigger the pause when no next GET request from the terminal is received within preset duration that starts from t, and the buffer status module is configured to set the buffer status to the play paused state according to the pause.

With reference to the first possible implementation manner of the embodiment of the second aspect of the present disclosure, in a second possible implementation manner of the embodiment of the second aspect of the present disclosure, the receiving module is further configured to receive the next GET request, correspondingly, the trigger module is further configured to trigger the resume according to the next GET request, and the buffer status module is further configured to set the buffer status to the normal play state according to the resume.

With reference to the first possible implementation manner of the embodiment of the second aspect of the present disclosure or the second possible implementation manner of the embodiment of the second aspect of the present disclosure, in a third possible implementation manner of the embodiment of the second aspect of the present disclosure, the trigger module is further configured to trigger the stream switch, and the buffer status module is further configured to set the buffer status to the stream switch state according to the stream switch.

With reference to any one of the foregoing possible implementation manners of the embodiment of the second aspect of the present disclosure, in a fourth possible implementation manner of the embodiment of the second aspect of the present disclosure, the trigger module is further configured to trigger the seek according to a keyword in the current GET request, and the buffer status module is further configured to set the buffer status to the re-buffering state according to the seek.

With reference to the embodiment of the second aspect of the present disclosure, in a fifth possible implementation manner of the embodiment of the second aspect of the present disclosure, the receiving module is configured to receive a fourth GET request from the terminal, the trigger module is configured to trigger the seek according to a keyword in the fourth GET request, and the buffer status module is configured to set the buffer status to the re-buffering state according to the seek.

With reference to the embodiment of the second aspect of the present disclosure, in a sixth possible implementation manner of the embodiment of the second aspect of the present disclosure, the receiving module is configured to receive a fifth GET request from the terminal, the trigger module is configured to trigger the resume according to the fifth GET request, and the buffer status module is configured to set the buffer status to the normal play state according to the resume.

With reference to the embodiment of the second aspect of the present disclosure, in a seventh possible implementation manner of the embodiment of the second aspect of the present disclosure, the receiving module is configured to receive a sixth GET request from the terminal, where the sixth request includes a stream indicator, the trigger module is configured to trigger the stream switch according to the stream indicator, and the buffer status module is configured to set the buffer status to the stream switch state according to the stream switch.

An embodiment of a third aspect of the present disclosure discloses an HTTP-based buffer status processor, where a buffer event includes seek, pause, resume, and stream switch, and a buffer status includes a re-buffering state, a normal play state, a play paused state, and a stream switch state, where the buffer status processor is configured to obtain the buffer event, and enter the play paused state when the buffer event is the pause, enter the normal play state when the buffer event is the resume, enter the re-buffering state when the buffer event is the seek, or enter the stream switch state when the event is the stream switch.

According to the buffer status processor in this embodiment of the present disclosure, a buffer status is updated based on a buffer event in a manner of analyzing only an HTTP Protocol field such that a buffer model is closer to a real client buffer situation.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 7 is a specific example of a value of a keyword contained in a GET request according to an embodiment of the present disclosure;

FIG. 8 is a specific example of a value of a keyword contained in a GET request according to another embodiment of the present disclosure;

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The HTTP is a most widely used network protocol on the Internet. HTTP is originally designed to provide a method for releasing and receiving an Hyper Text Markup Language (HTML) page. A resource requested using the HTTP or Hypertext Transfer Protocol Secure (HTTPS) Protocol is identified by a uniform resource identifier (URI). Development of HTTP is an outcome of cooperation between the World Wide Web Consortium (W3C) and the Internet Engineering Task Force (IETF). A currently widely used version HTTP 1.1 in the HTTP is defined in the request for comment (RFC) 2616 published in June 1999.

Figure 3:
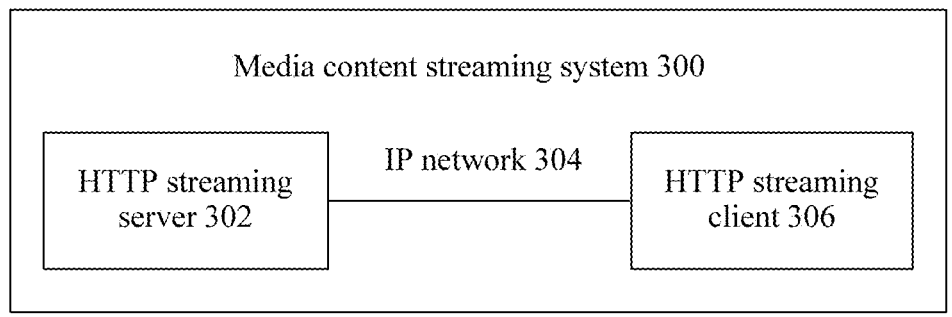
FIG. 3 is a schematic diagram of an HTTP-based media content streaming system according to an embodiment of the present disclosure.

FIG. 3 describes an HTTP-based media content streaming system 300, and the system may implement a concept and a method of the present disclosure. The media content streaming system 300 has an HTTP streaming server 302 that can transmit streaming media to an HTTP streaming client 306 using an IP network 304. It should be understood that another embodiment may also be applicable to another streaming system except an HTTP streaming system.

Figure 4:
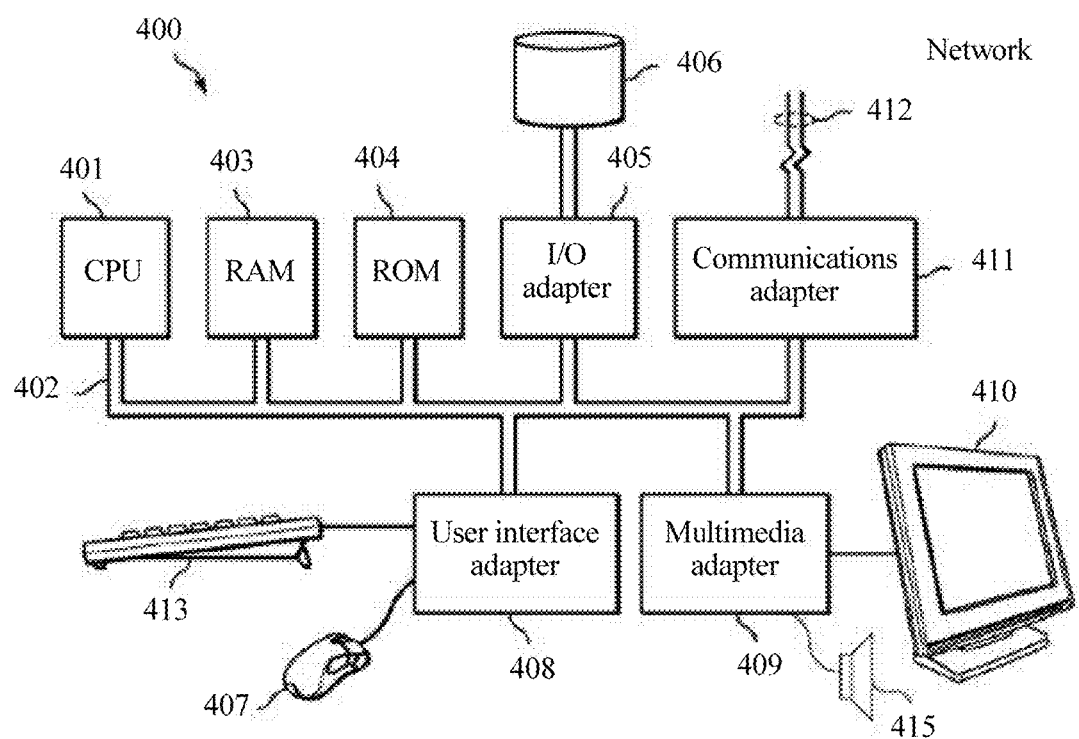
FIG. 4 is a schematic diagram of hardware implementation of HTTP streaming transmission according to an embodiment of the present disclosure.

FIG. 4 describes a computer system 400 that can use embodiments of the present disclosure by means of self-adaption, for example, store and/or run software related to the embodiments. A central processing unit (CPU) 401 is coupled to a system bus 402. The CPU 401 may be a general purpose CPU. However, provided that the CPU 401 supports the creative operation in this specification, the embodiments of the present disclosure are not limited to an architecture of the CPU 401. The bus 402 is coupled to a random access memory (RAM) 403, and the latter may be a static RAM (SRAM), a dynamic RAM (DRAM), or a synchronous dynamic RAM (SDRAM). A read only memory (ROM) 404, such as a programmable ROM (PROM), an erasable programmable ROM (EPROM), or an electrically erasable programmable ROM (EEPROM), may also be coupled to the bus 402. The RAM 403 and the ROM 404 store common user and system data, and programs in the art.

The bus 402 is also coupled to an input/output (I/O) adapter 405, a communications adapter 411, a user interface adapter 408, and a multimedia adapter 409. The I/O adapter 405 connects the computer system 400 and a storage device 406, for example, one or more of the following drives: a hard disk drive, a compact disc (CD) drive, a floppy disk drive, and a tape drive. The I/O adapter 405 may be further connected to a printer (which is not shown), and the latter helps the system to print a paper copy of information such as a file, a picture, or an article. It should be noted that the printer may be a dot matrix printer or a laser printer, or may be a fax machine, a scanner, or a photocopier. The user interface adapter is coupled to a keyboard 413, a mouse 407, and another device. In some embodiments, this may be that the multimedia adapter 409 of a monitor and/or an audio card is connected to a display device 410 and an audio device 415. The display device 410 may be a cathode ray tube (CRT), a flat-panel display, or a display device of another type, and the audio device 415 may be a loudspeaker, a headset, or another analog or digital audio system.

In some embodiments, HTTP streaming refers to multimedia content streaming based on the HTTP. Streaming distribution is supported by third Generation Partnership Project (3GPP) release 4 and a later release. Streaming distribution based on a Real Time Streaming Protocol (RTSP) over UDP and the RTP over UDP is described in the 3GPP Technical Specification (TS) 26.234, and an HTTP-based buffer updating method provided in the embodiments of the present disclosure is mainly based on the HTTP and the RTP. HTTP streaming becomes a main form of Internet video distribution, and HTTP being used as a main protocol for multimedia distribution has become a trend. In another embodiment, another streaming system and standard may be used.

Technical reasons that HTTP streaming is widely used include a standard server and a standard HTTP buffer (or generally a relatively cheap server) may be used to distribute content in order to distribute content from a content delivery network (CDN) or any other standard server clusters, and control over "a streaming session" can be entirely transferred to a client, and the latter basically enables only one or more TCP interfaces that connect to one or more standard HTTP servers. A reason that HTTP streaming is widely used further lies in that, HTTP streaming can overcome a firewall traversal problem, and therefore can provide a streaming service easily.

One HTTP streaming method is referred to as a static content service mode. In this mode, a standard HTTP server is used without any extension. Content is provided in a form of a file or a group of files, and such files may be acquired from the HTTP server. A client acquires content by accessing a file that has or has no byte range because of using an HTTP GET request.

A system and a method of an HTTP streaming technology of audio and/or a video and/or a multimedia stream of another media type are used in the embodiments of the present disclosure. Such a system and method may flexibly and effectively support an on-demand technology and a live technology that are based on a storage method, a media presentation description (MPD), and an HTTP GET request that has or has no byte range. The MPD may include a byte range and a time range that are of a media segment such that a client can efficiently request to use only the media segment of the byte range. The MPD may include more encoding and decoding information of another media presentation in order to support media content for which more than one encoding configuration is used during encoding.

HTTP is a standard of a request and a response of a client terminal (user) and a server end (website). The client initiates an HTTP request to a specified port (port 80 by default) on the server using a web browser, a web crawler, or another tool. This client is referred to as a user agent program. The server making a response stores some resources, for example, an HTML file and an image. This response server is referred to as an origin server. Multiple "intermediate layers", for example, a proxy, a gateway, or a tunnel, may exist between the user agent and the origin server.

Although the TCP/IP is the most popular application on the Internet, in the HTTP, it is not specified that the TCP/IP or a layer supported by the TCP/IP has to be used. Actually, HTTP may be implemented on any Internet based protocol or another network. It is assumed in HTTP that a lower-layer protocol of HTTP provides reliable transmission. Therefore, any protocol that can provide this guarantee can be used by HTTP. Therefore, i.e. HTTP uses TCP in the TCP/IP family, as a transport layer of HTTP.

Generally, an HTTP client initiates a request to create a TCP connection to a specified port (port 80 by default) on a server. An HTTP server listens to a request of the client on that port. Once a request is received, the server returns a status to the client, for example, "HTTP/1.1 200 OK" and returned content, such as a file requested, an error message, or other information.

Eight methods (also referred to as "actions") are defined in the HTTP/1.1 Protocol to operate a specified resource in different manners.

OPTIONS: this method can enable a server to return all HTTP request methods supported by the resource. '*' is used to replace a resource name, and an OPTIONS request is sent to a web server in order to test whether a server function is operating normally.

HEAD: is used to send a request for a specified resource to a server, which is the same as a GET method except that the server does not return a message-body of the resource. An advantage of the HEAD method lies in that, using this method, "information about the resource" (metainformation or referred to as metadata) can be acquired without transmitting all content.

GET: is used to send a "explicit" request for a specified resource. The GET method means acquiring information (in a format of an entity) specified by a request-URI. When the request-URI refers to a data-producing process, it is the produced data which shall be returned as the entity in the response and not the source text of the process, unless that the source text happens to be the output of the process. The semantics of GET change to a "conditional GET" when the request message includes a If-Modified-Since, If-Unmodified-Since, If-Match, If-None-Match, or If-Range header field. A conditional GET method requests an entity that meets a conditional header field. The conditional GET method is intended to reduce unnecessary network usage by allowing cached entities to be refreshed without requiring multiple requests or transferring an entity already held by the client.

The GET method changes to a "partial Get" method when the request message includes a Range header field. A partial GET method requests a part of an entity. The partial GET method is intended to reduce unnecessary network usage by allowing the client to acquire partial entity data from the server without acquiring partial entity data already held by the client locally.

POST: is used to submit data to a specified resource and request a server to perform processing (for example, submit a form or upload a file). Data is included in a request text. This request may be used to create a new resource, or modify an existing resource, or both.

PUT: is used to upload latest content to a specified resource location.

DELETE: is used to request a server to delete a resource identified by a request-URI.

TRACE: is used to echo a request received by a server, which is mainly used for testing or diagnosis.

CONNECT: The HTTP/1.1 Protocol reserves the method CONNECT for a proxy server that can change a connection to be in a tunnel manner, which is generally used for a link of an Secure Socket Layer (SSL) encrypted server (using an unencrypted HTTP agent server).

Figure 5:
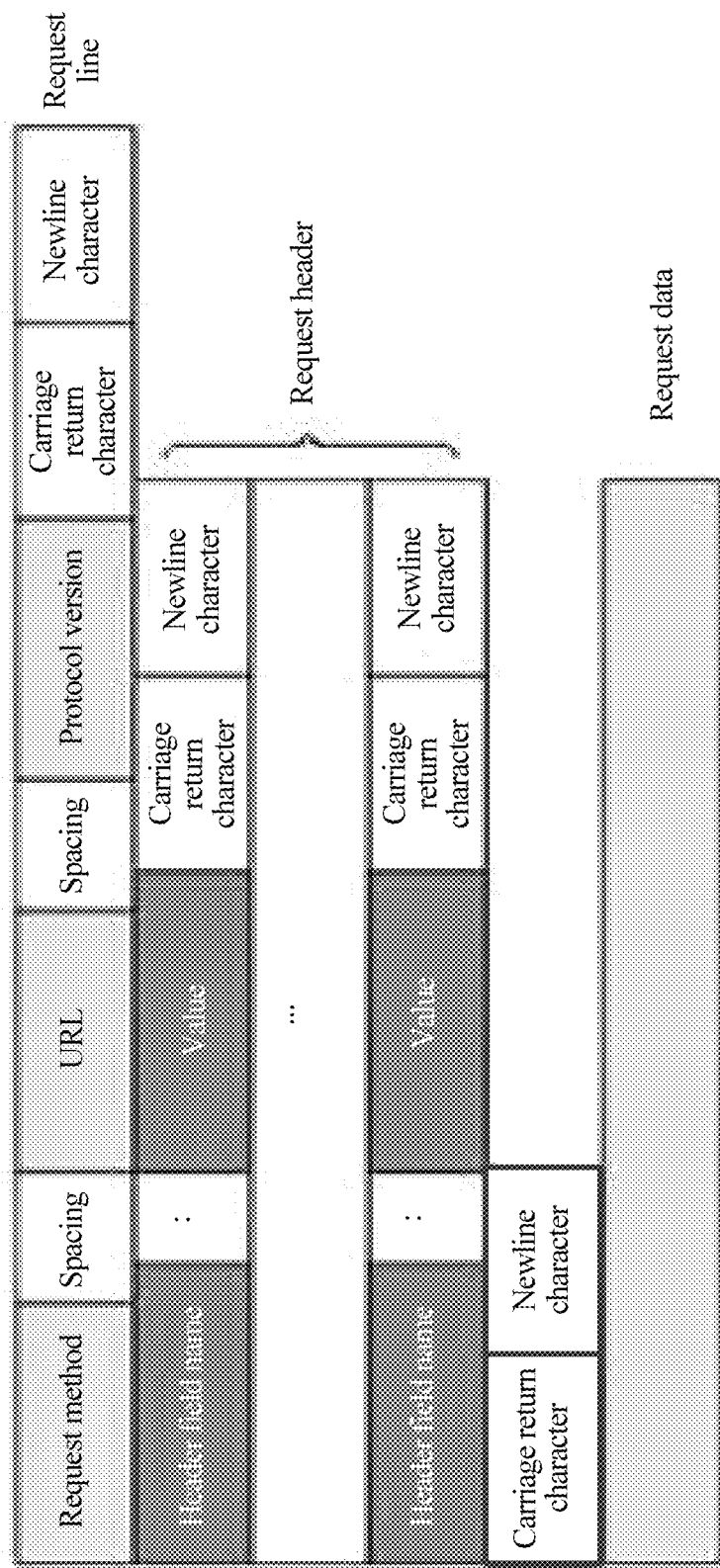
FIG. 5 is a schematic diagram of a format of an HTTP packet according to an embodiment of the present disclosure.

The following describes a format of an HTTP packet according to an embodiment of the present disclosure with reference to FIG. 5.

The HTTP packet is text-oriented. Each field in the packet is some American Standard Code for Information interchange (ASCII) code strings, and a length of each field is uncertain. There are two types of HTTP packets, a request packet and a response packet.

Request packet: an HTTP request packet is formed by four parts, i.e. a request line, a request header, a blank line, and request data. FIG. 5 gives a general format of the request packet.

(1) Request Line.

The request line is formed by three fields, i.e. a request method field, a uniform resource locator (URL) field, and an HTTP Protocol version field, and they are separated by a spacing, for example, GET /index.html HTTP/1.1.

Request methods of the HTTP include GET, POST, HEAD, PUT, DELETE, OPTIONS, TRACE, and CONNECT. The most commonly used GET method and POST method are introduced herein.

GET: when a client needs to read a document from a server, the GET method is used. The GET method requires the server to place a resource located by a URL in a data part of a response packet and return the response packet to the client. A request parameter and a corresponding value are appended to the rear of the URL when the GET method is used, a question mark ("?") is used to represent the end of the URL and the start of the request parameter, and a length of a parameter to be transferred is limited, for example, /index.jsp?id=100&op=bind.

POST: when a client provides relatively much information to a server, the POST method may be used. In the POST method, a request parameter is encapsulated into HTTP request data. The request parameter appears in a form of a name/value, can be used to transmit a large amount of data, and can be used to transfer a file.

(2) Request Header.

The request header is formed by a keyword/value pair, and there is one pair on each line, where the keyword and the value are separated by colon ":". The request header is used to notify the server of information requested by the client. A typical request header includes the following.

User-Agent: a type of a browser that produces a request;

Accept: a content type list that can be identified by the client; and

Host: a requested host name that allows multiple domain names to have a same IP address, i.e. a virtual host.

(3) Blank Line.

Following the last request header is a blank line for sending a carriage return character and a newline character to notify a server that there is no request header any more in the following.

For a complete HTTP request, the blank line is necessary. Otherwise, the server is in a waiting state because it considers that data requested this time has not been sent to the server completely.

(4) Request Data.

The request data is not used in the GET method, but is used in the POST method. The POST method is applicable to a scenario in which a user needs to fill in a form. The most commonly used request headers that relate to the request data are Content-Type and Content-Length.

The following is a specific request example that separately represents a POST packet and a GET packet.

GET:

A header of the GET packet is as follows.

GET /sn/index.php?sn=123&n=asa HTTP/1.1
Accept: */*
Accept-Language: zh-cn
host: localhost
Content-Type: application/x-www-form-urlencoded
Content-Length: 12
Connection: close.

POST:

A header of the POST packet is as follows:

POST /sn/index.php HTTP/1.1
Accept: */*
Accept-Language: zh-cn
host: localhost
Content-Type: application/x-www-form-urlencoded
Content-Length: 12
Connection: close
sn=123&n=asa The HTTP header is followed by a blank line. Following the blank line, post data is sent. A length of the post data is indicated using Content-Length: 12, where the post data includes two items:

sn=123, and n=asa, where Content-Type: application/x-www-form-urlencoded specifies an encoding type of the POST data, and Content-Length: 12 specifies the length of the POST data.

For a specific field meaning and explanation, refer to a specification in the HTTP.

Figure 1:
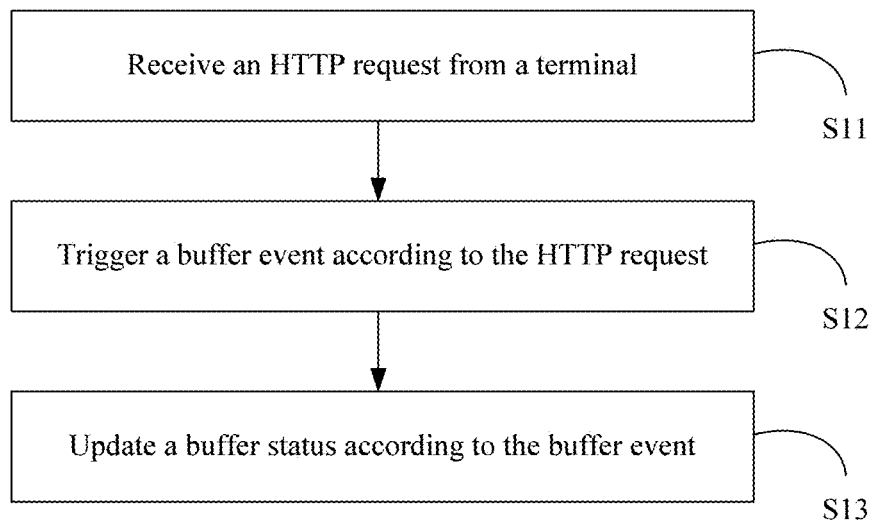
FIG. 1 is a schematic flowchart of an HTTP-based buffer status updating method according to an embodiment of the present disclosure.

The following describes an HTTP-based buffer status updating method according to an embodiment of the present disclosure with reference to FIG. 1. As shown in FIG. 1, this method includes the following steps.

Step S11: Receive an HTTP request from a terminal.

In an embodiment of the present disclosure, a current GET request from the terminal is received, where a time at which the current GET request is received is t1.

In an embodiment of the present disclosure, a first GET request from the terminal is received.

In an embodiment of the present disclosure, a second GET request from the terminal is received.

In an embodiment of the present disclosure, a third GET request from the terminal is received, where the third GET request includes a stream indicator.

It may be understood that the foregoing examples are examples that are mainly provided to help understand this embodiment of the present disclosure, but are not intended to limit this embodiment of the present disclosure. Buffer events of this embodiment of the present disclosure may be mutually processed independently. Buffer statuses are correspondingly updated according to different buffer events.

This method may be executed by a server of an HTTP streaming system, or may be executed by a network management system or a network device that has a probe capability.

Step S12: Trigger a buffer event according to the HTTP request.

In an embodiment of the present disclosure, pause in the buffer event is triggered when no next GET request from the terminal is received within preset duration that starts from t1.

It may be understood that the preset duration mentioned in this step may be an empirical value, for example, 3 to 5 seconds, or may be duration that is set according to a specific media service and matches the media service.

In an embodiment of the present disclosure, seek is triggered according to a keyword in the first GET request.

Figures 7, 8:
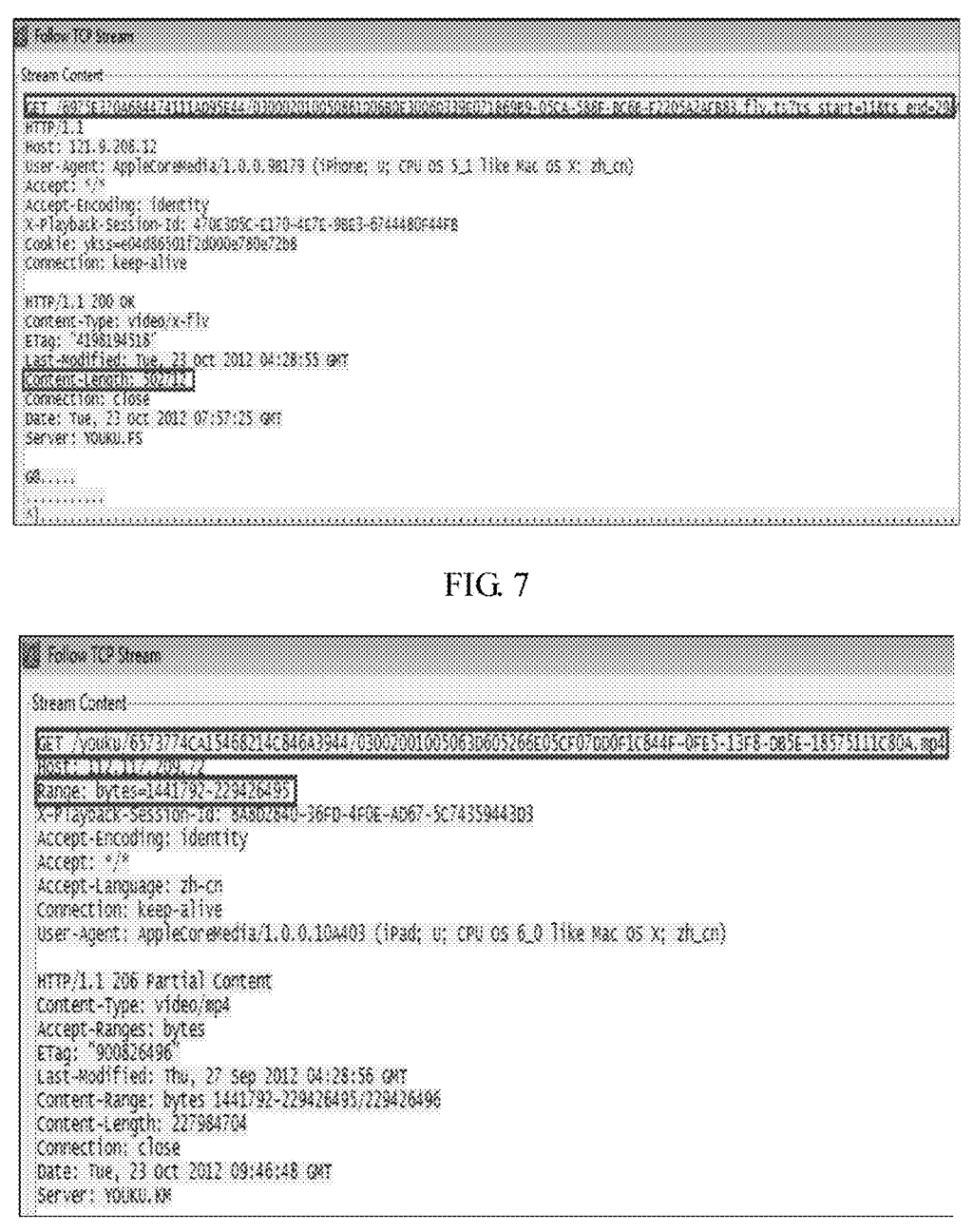

In a specific example, the seek is triggered when a difference between a ts_start value in the first GET request and a ts_start value in a previous GET request (relative to the first GET request) from the terminal is greater than a preset threshold and a difference between a ts_end value in the first GET request and a ts_end value in the previous GET request from the terminal is greater than the preset threshold. That values are consecutive herein is described in terms of a keyword. For example, when the ts_start value in the previous GET request is 1, and the ts_end value in the previous GET request is 200, and the ts_start value in the first GET request is 201, and the ts_end value in the first GET request is 400, it may be considered that the values are consecutive. A set threshold may be a byte count or duration. The threshold may be an empirical value, for example, 1, 100, or 400, or may be set in another manner that can be easily figured out by a person of ordinary skill in the art without creative efforts. For a specific example of a value in a GET request, refer to FIG. 7.

In a specific example, Range values in consecutive GET requests are compared to determine whether the values are consecutive. The seek in the buffer event occurs when a difference between Range values in two consecutive GET requests is greater than a set threshold. The set threshold may be a byte count or duration. The threshold may be an empirical value, for example, 1, 3, or 5, or may be set in another manner that can be easily figured out by a person of ordinary skill in the art without creative efforts. For a specific example of a Range value in a GET request, refer to FIG. 8.

In a specific example, begin values in consecutive GET requests are compared to determine whether the values are consecutive. The seek in the buffer event occurs when a difference between begin values in two consecutive GET requests is greater than a set threshold. The set threshold may be a byte count or duration. The threshold may be an empirical value, for example, 1, 3, or 5, or may be set in another manner that can be easily figured out by a person of ordinary skill in the art without creative efforts. For a specific example of a begin value in a GET request, refer to the following.

http://o-o---preferred---ord12s17---v9---nonxt8.c.youtube.com/videoplayback?upn=ZklvQD0CWlk&*&itag=22&signature=CB56719507C9C7792A578C38776DC229D11692F0.371C9E4DB6063A48A0ACD76D5E8A2EAC9E10595C&*&id=2b72abf2705cbde0&begin=834234.

In an embodiment of the present disclosure, resume is triggered according to the second GET request. After pause occurs, the resume in the buffer event occurs when a next GET request (i.e. the second GET request) for a same media stream is received. It may be understood that, in the prior art, there are multiple manners based on the HTTP to determine whether two GET requests belong to a same media stream, and details are not described herein.

In an embodiment of the present disclosure, stream switch is triggered according to the third GET request. In a specific example, the stream switch in the buffer event occurs when an itag value in the third GET request changes. For example, refer to the following.

http://o-o---preferred---ord12s17---v9---nonxt8.c.youtube.com/videoplayback?upn=ZklvQD0CWlk&*&itag=22&signature=CB56719507C9C7792A578C38776DC229D11692F0.371C9E4DB6063A48A0ACD76D5E8A2EA9E10595C&*&id=2b72abf2705cbde0&begin=834234.

In the example, the itag value in the third GET request is 22. The stream switch in the buffer event occurs when an itag value in a previous GET request (relative to the third GET request) is not 22, for example, may be 20 or 24.

Step S13: Update a buffer status according to the buffer event.

In an embodiment of the present disclosure, the buffer status is set to a play paused state according to the pause.

In an embodiment of the present disclosure, the buffer status is set to a re-buffering state according to the seek.

In an embodiment of the present disclosure, the buffer status is set to a normal play state according to the resume.

In an embodiment of the present disclosure, the buffer status is set to a stream switch state according to the stream switch.

It may be understood that the foregoing examples are examples that are mainly provided to help understand this embodiment of the present disclosure, but are not intended to limit this embodiment of the present disclosure. Buffer events of this embodiment of the present disclosure may be mutually processed independently. Buffer statuses are correspondingly updated according to different buffer events.

According to the HTTP-based buffer status updating method in this embodiment of the present disclosure, corresponding buffer status switching is triggered by means of determining a buffer event, which can accurately satisfy a buffer requirement of an existing media service such that a buffer model is closer to a real client buffer situation.

Figure 2:
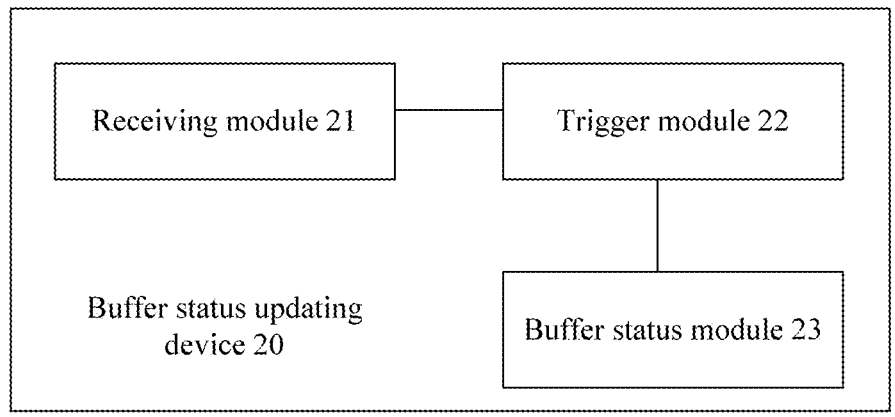
FIG. 2 is a schematic structural diagram of an HTTP-based buffer status updating device according to an embodiment of the present disclosure.

The following further describes an HTTP-based buffer status updating device 20 according to an embodiment of the present disclosure with reference to FIG. 2. As shown in FIG. 2, the buffer status updating device 20 includes a receiving module 21, a trigger module 22, and a buffer status module 23. The receiving module 21 connects to the trigger module 22, and the buffer status module 23 connects to the trigger module 22.

The receiving module 21 is configured to receive an HTTP request from a terminal.

In an embodiment of the present disclosure, a current GET request from the terminal is received, where a time at which the current GET request is received is t1.

In an embodiment of the present disclosure, a first GET request from the terminal is received.

In an embodiment of the present disclosure, a second GET request from the terminal is received.

In an embodiment of the present disclosure, a third GET request from the terminal is received, where the third GET request includes a stream indicator.

It may be understood that the foregoing examples are examples that are mainly provided to help understand this embodiment of the present disclosure, but are not intended to limit this embodiment of the present disclosure. Buffer events of this embodiment of the present disclosure may be mutually processed independently. Buffer statuses are correspondingly updated according to different buffer events.

The trigger module 22 triggers a buffer event according to the HTTP request.

In an embodiment of the present disclosure, pause in the buffer event is triggered when no next GET request from the terminal is received within preset duration that starts from t1.

It may be understood that the preset duration mentioned in this step may be an empirical value, for example, 3 to 5 seconds, or may be duration that is set according to a specific media service and matches the media service.

In an embodiment of the present disclosure, seek is triggered according to a keyword in the first GET request.

In a specific example, the seek is triggered when a difference between a ts_start value in the first GET request and a ts_start value in a previous GET request (relative to the first GET request) from the terminal is greater than a preset threshold and a difference between a ts_end value in the first GET request and a ts_end value in the previous GET request from the terminal is greater than the preset threshold. That values are consecutive herein is described in terms of a keyword. For example, when the ts_start value in the previous GET request is 1, and the ts_end value in the previous GET request is 200, and the ts_start value in the first GET request is 201, and the ts_end value in the first GET request is 400, it may be considered that the values are consecutive. A set threshold may be a byte count or duration. The threshold may be an empirical value, for example, 1, 100, or 400, or may be set in another manner that can be easily figured out by a person of ordinary skill in the art without creative efforts. For a specific example of a value in a GET request, refer to FIG. 7.

In a specific example, Range values in consecutive GET requests are compared to determine whether the values are consecutive. The seek in the buffer event occurs when a difference between Range values in two consecutive GET requests is greater than a set threshold. The set threshold may be a byte count or duration. The threshold may be an empirical value, for example, 1, 3, or 5, or may be set in another manner that can be easily figured out by a person of ordinary skill in the art without creative efforts. For a specific example of a Range value in a GET request, refer to FIG. 8.

In a specific example, begin values in consecutive GET requests are compared to determine whether the values are consecutive. The seek in the buffer event occurs when a difference between begin values in two consecutive GET requests is greater than a set threshold. The set threshold may be a byte count or duration. The threshold may be an empirical value, for example, 1, 3, or 5, or may be set in another manner that can be easily figured out by a person of ordinary skill in the art without creative efforts. For a specific example of a begin value in a GET request, refer to the following.

http://o-o---preferred---ord12s17---v9---nonxt8.c.youtube.com/videoplayback?upn=Z klvQD0CWlk&*&itag=22&signature=CB56719507C9 C7792A578C38776DC229D11692F0.371C9E4DB6063A 48A0ACD76D5E8A2EAC9E10595C&*&id=2b72abf2 705cbde0&begin=834234.

In an embodiment of the present disclosure, resume is triggered according to the second GET request. After pause occurs, the resume in the buffer event occurs when a next GET request (i.e. the second GET request) for a same media stream is received. It may be understood that, in the prior art, there are multiple manners based on the HTTP to determine whether two GET requests belong to a same media stream, and details are not described herein.

In an embodiment of the present disclosure, stream switch is triggered according to the third GET request. In a specific example, the stream switch in the buffer event occurs when an itag value in the third GET request changes. For example, refer to the following.

http://o-o---preferred---ord12s17---v9---nonxt8.c.youtube.com/videoplayback?upn=Z klvQD0CWlk&*&itag=22&signature=CB56719507C9 C7792A578C38776DC229D11692F0. 371C9E4DB6063A48A0ACD76D5E8A2EAC9E10595 C&*&id=2b72abf2705cbde0&begin=834234.

In the example, the itag value in the third GET request is 22. The stream switch in the buffer event occurs when an itag value in a previous GET request (relative to the third GET request) is not 22, for example, may be 20 or 24.

The buffer status module 23 is configured to update a buffer status according to the buffer event.

In an embodiment of the present disclosure, the buffer status is set to a play paused state according to the pause.

In an embodiment of the present disclosure, the buffer status is set to a re-buffering state according to the seek.

In an embodiment of the present disclosure, the buffer status is set to a normal play state according to the resume.

In an embodiment of the present disclosure, the buffer status is set to a stream switch state according to the stream switch.

It may be understood that the foregoing examples are examples that are mainly provided to help understand this embodiment of the present disclosure, but are not intended to limit this embodiment of the present disclosure. Buffer events of this embodiment of the present disclosure may be mutually processed independently. Buffer statuses are correspondingly updated according to different buffer events.

According to the HTTP-based buffer status updating device 20 in this embodiment of the present disclosure, corresponding buffer status switching is triggered by means of determining a buffer event, which can accurately satisfy a buffer requirement of an existing media service such that a buffer model is closer to a real client buffer situation. Correspondingly, for a function executed by each module of the updating device 20, refer to a corresponding method embodiment, and details are not described herein.

Figure 6:
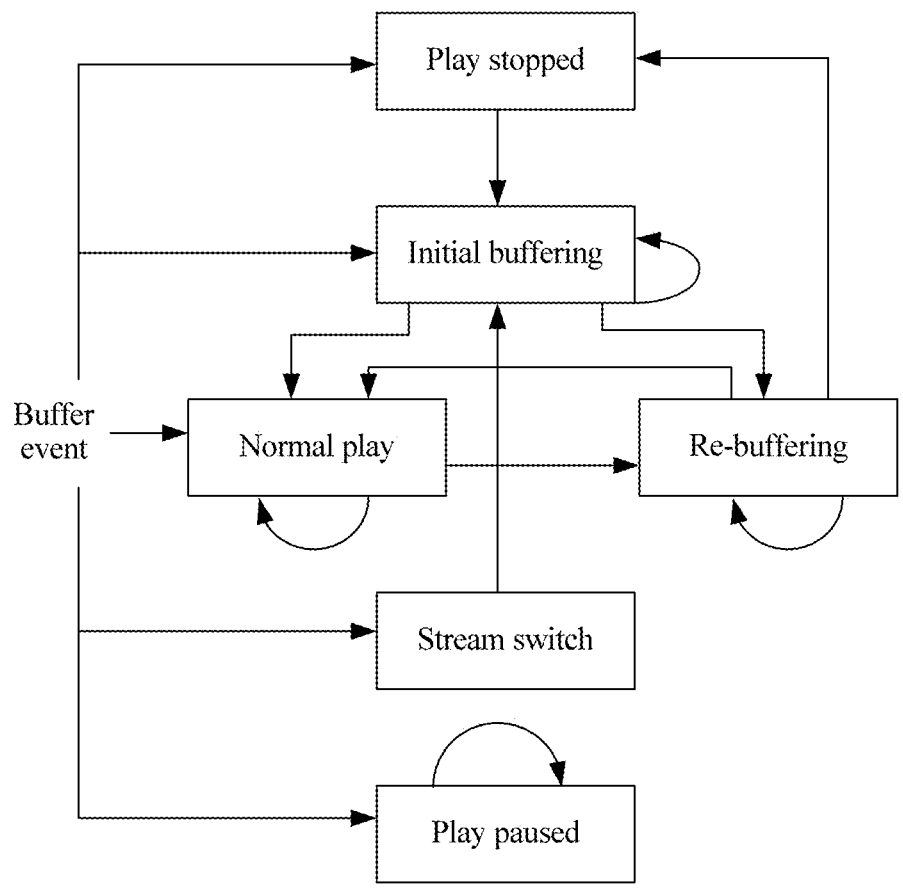
FIG. 6 is a schematic diagram of conversion between a buffer event and a buffer status according to an embodiment of the present disclosure.

The following further describes an HTTP-based buffer status updating method according to an embodiment of the present disclosure with reference to FIG. 6.

In the embodiments of the present disclosure, a buffer event includes seek, pause, resume, and stream switch. Meanings represented by buffer events such as seek, pause, and resume are consistent with those in the prior art. For example, reference may be made to a specification in the International Telecommunication Union-Telecommunication Standardization Sector (ITU-T) G.1021 standard, and details are not described herein. A stream switch event represents selection of a different code rate file in multiple media file descriptions.

In the embodiments of the present disclosure, a buffer status of a buffer may include at least one of an initial buffering state, a normal play state, a re-buffering state, a play stopped state, a play paused state, or a stream switch state. For buffer changes of a terminal that are represented by the initial buffering state, the normal play state, the re-buffering state, the play stopped state, and the play paused state, refer to the G.1021 standard established by the ITU-T, and details are not described herein. It is particularly noted that, buffer status updating is performed based on the UDP in this standard, whereas a buffer status updating solution provided in the embodiments of the present disclosure is based on the TCP.

An initial status of a buffer status updating model is set to the initial buffering state, i.e. a buffer status before the current status update is the initial buffering state when a current status update is the first status update. A buffer status before the current status update is a buffer status acquired in a last status update when the current status update is not the first status update, and the buffer status before the current status update may be any one of the initial buffering state, the normal play state, the re-buffering state, the play stopped state, the play paused state, or the stream switch state. Correspondingly, regardless of whether the current status update is the first status update, an updated current buffer status may also be any one of the initial buffering state, the normal play state, the re-buffering state, the play stopped state, the play paused state, or the stream switch state. Switching between each buffer status is triggered based on the buffer event. A switch relationship between each buffer status is shown in FIG. 6.

In an embodiment of the present disclosure, the pause and the resume in the buffer event are determined by determining whether an HTTP GET request arrives.

After a GET request sent by a user end is received, the pause in the buffer event occurs when no new GET request from a user is received within a set duration threshold. The duration threshold herein may be an empirical value, for example, 1 second, 3 seconds, or 5 seconds, or may be a value that is set according to a specific media application service.

After pause occurs, the resume in the buffer event occurs when a next GET request for a same media stream is received. It may be understood that, in the prior art, there are multiple manners based on the HTTP to determine whether two GET requests belong to a same media stream, and details are not described herein.

In an embodiment of the present disclosure, the seek and the stream switch in the buffer event may be determined by analyzing a keyword in a GET request.

The stream switch in the buffer event occurs when an itag value in the GET request changes. For example, refer to the following.

http://o-o---preferred---ord12s17---v9---nonxt8.c.youtube.com/videoplayback?upn=Z klvQD0CWlk&*&itag=22&signature=CB56719507C9 C7792A578C38776DC229D11692F0.371C9E4DB6063A4 8A0ACD76D5E8A2EAC9E10595C&*&id=2b72abf270 5cbde0&begin=834234.

In the example, an itag value in a current GET request is 22. The stream switch in the buffer event occurs when an itag value in a previous GET request is not 22, for example, may be 20 or 24.

Range values in consecutive GET requests are compared to determine whether the values are consecutive. The seek in the buffer event occurs when a difference between Range values in two consecutive GET requests is greater than a set threshold. The set threshold may be a byte count or duration. The threshold may be an empirical value, for example, 1, 100, or 400, or may be set in another manner that can be easily figured out by a person of ordinary skill in the art without creative efforts.

A current buffer status is updated according to the buffer event, where the re-buffering state is entered when the buffer event is the seek, the normal play state is entered when the buffer event is the resume, and the play paused state is entered when the buffer event is the pause.

It may be understood that the foregoing several types of determining are independent of each other, and a sequence among them is not limited.

In an embodiment of the present disclosure, the pause and the resume in the buffer event are determined by determining whether an HTTP GET request arrives.

After a GET request sent by a user end is received, the pause in the buffer event occurs when no new GET request from a user is received within a set duration threshold. The duration threshold herein may be an empirical value, for example, 1 second, 3 seconds, or 5 seconds, or may be a value that is set according to a specific media application service.

After pause occurs, the resume in the buffer event occurs when a next GET request for a same media stream is received. It may be understood that, in the prior art, there are multiple manners based on the HTTP to determine whether two GET requests belong to a same media stream, and details are not described herein.

In an embodiment of the present disclosure, the seek and the stream switch in the buffer event may be determined by analyzing a keyword in a GET request.

The ts_start values and the ts_end values in consecutive GET requests are compared to determine whether the values are consecutive. The seek in the buffer event occurs when a difference between is start values and a difference between is end values in two consecutive GET requests are greater than a set threshold. That the values are consecutive herein is described in terms of a keyword. For example, when a ts_start value in a previous GET request is 1, and a ts_end value in the previous GET request is 200, and a ts_start value in a current GET request is 201, and a ts_end value in the current GET request is 400, it may be considered that the values are consecutive. A set threshold may be a byte count or duration. The threshold may be an empirical value, for example, 1, 100, or 400, or may be set in another manner that can be easily figured out by a person of ordinary skill in the art without creative efforts. For a specific example of a value in a GET request, refer to FIG. 7.

A current buffer status is updated according to the buffer event, where the re-buffering state is entered when the buffer event is the seek, the normal play state is entered when the buffer event is the resume, and the play paused state is entered when the buffer event is the pause.

It may be understood that the foregoing several types of determining are independent of each other, and a sequence among them is not limited.

In an embodiment of the present disclosure, the pause and the resume in the buffer event are determined by determining whether an HTTP GET request arrives.

After a GET request sent by a user end is received, the pause in the buffer event occurs when no new GET request from a user is received within a set duration threshold. The duration threshold herein may be an empirical value, for example, 1 second, 3 seconds, or 5 seconds, or may be a value that is set according to a specific media application service.

After pause occurs, the resume in the buffer event occurs when a next GET request for a same media stream is received. It may be understood that, in the prior art, there are multiple manners based on the HTTP to determine whether two GET requests belong to a same media stream, and details are not described herein.

In an embodiment of the present disclosure, the seek and the stream switch in the buffer event may be determined by analyzing a keyword in a GET request.

Range values in consecutive GET requests are compared to determine whether the values are consecutive. The seek in the buffer event occurs when a difference between Range values in two consecutive GET requests is greater than a set threshold. The set threshold may be a byte count or duration. The threshold may be an empirical value, for example, 1, 3, or 5, or may be set in another manner that can be easily figured out by a person of ordinary skill in the art without creative efforts. For a specific example of a Range value in a GET request, refer to FIG. 8.

A current buffer status is updated according to the buffer event, where the re-buffering state is entered when the buffer event is the seek, the normal play state is entered when the buffer event is the resume, and the play paused state is entered when the buffer event is the pause.

It may be understood that the foregoing several types of determining are independent of each other, and a sequence among them is not limited.

In an embodiment of the present disclosure, the pause and the resume in the buffer event are determined by determining whether an HTTP GET request arrives.

After a GET request sent by a user end is received, the pause in the buffer event occurs when no new GET request from a user is received within a set duration threshold. The duration threshold herein may be an empirical value, for example, 1 second, 3 seconds, or 5 seconds, or may be a value that is set according to a specific media application service.

After pause occurs, the resume in the buffer event occurs when a next GET request for a same media stream is received. It may be understood that, in the prior art, there are multiple manners based on the HTTP to determine whether two GET requests belong to a same media stream, and details are not described herein.

In an embodiment of the present disclosure, the seek and the stream switch in the buffer event may be determined by analyzing a keyword in a GET request, where begin values in consecutive GET requests are compared to determine whether the values are consecutive. The seek in the buffer event occurs when a difference between begin values in two consecutive GET requests is greater than a set threshold. The set threshold may be a byte count or duration. The threshold may be an empirical value, for example, 1, 3, or 5, or may be set in another manner that can be easily figured out by a person of ordinary skill in the art without creative efforts. For a specific example of a begin value in a GET request, refer to the following.

http://o-o---preferred---ord12s17---v9---nonxt8.c.youtube.com/videoplayback?upn=Z klvQD0CWlk&*&itag=22&signature=CB56719507C9 C7792A578C38776DC229D11692F0.371C9E4DB6063A 48A0ACD76D5E8A2EAC9E10595C&*&id=2b72abf2 705cbde0&begin=834234.

A current buffer status is updated according to the buffer event, where the re-buffering state is entered when the buffer event is the seek, the normal play state is entered when the buffer event is the resume, and the play paused state is entered when the buffer event is the pause.

It may be understood that the foregoing several types of determining are independent of each other, and a sequence among them is not limited.

Figure 9:
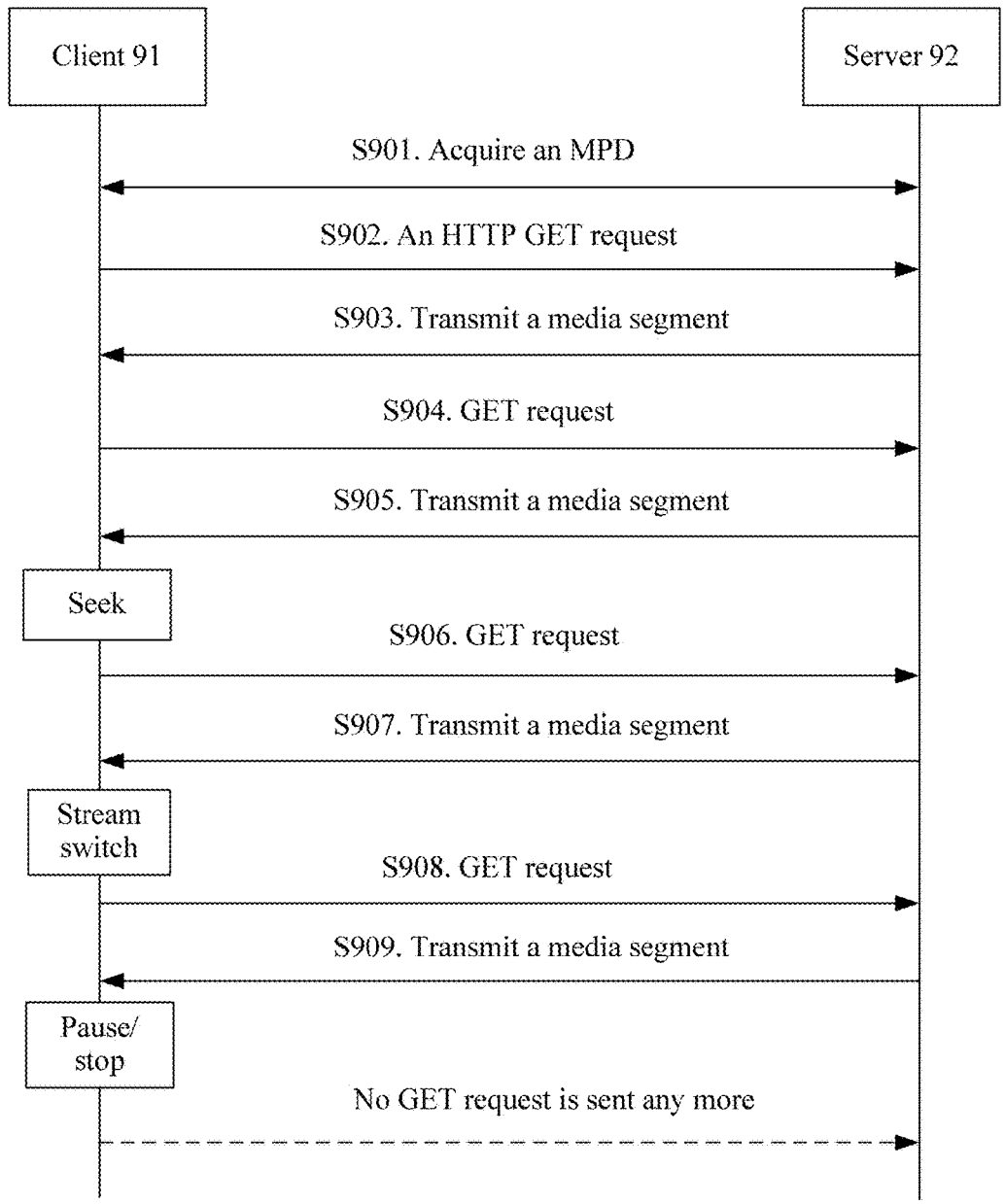
FIG. 9 is a schematic diagram of a specific application according to an embodiment of the present disclosure.

The following describes, with reference to FIG. 9, a specific application of an HTTP-based buffer status updating method in an embodiment of the present disclosure in an environment specified by Dynamic Adaptive Streaming over HTTP (DASH). For specific content of the DASH standard, refer to a specification of standard organizations such as the 3GPP and the Moving Picture Experts Group (MPEG), and details are not described herein.

As shown in FIG. 9, a streaming processing procedure includes the following steps.

Step S901: A client 91 obtains an MPD file from a server 92. A specific acquiring manner may be that the client 91 sends an MPD acquiring request to the server 92 and then receives the MPD file sent by the server 92, or may be that the server 92 directly sends the MPD file to the client 91. For a specific format of the MPD file, refer to a related specification of the 3GPP-DASH and the MPEG-DASH, and details are not described herein.

In a possible manner of this embodiment, the client 91 may acquire an MPD using an HTTP GET request. Alternatively, the client 91 may acquire an MPD in a progressive manner (i.e. use multiple HTTP GET requests that have a byte range). Each item in the MPD may include media content data of one or more files, and each file is associated with a unique URL.

The MPD may include maximum lengths of all segments such that a byte range can be used without signaling of the byte range in the MPD, and a size of the MPD is greatly reduced, which means that a start delay in a streaming process is reduced. To indicate that a live streaming session ends, the server may use an abnormal manner to form a next expected file or segment, for example, to clear a file or a segment. In order that a streaming server can switch to the live streaming session successfully and start to request latest content, a special file name is used for a file that is available in the streaming server and that includes a latest segment, and then a special URL is used. To enable the client to compute a specific file that is started when the client wants to search for a specific temporary location, when duration of the segment keeps unchanged and each segment in the MPD has no any byte offset signaling or time offset signaling, a URL of the file can be generated, where the URL may have a function of indicating a time when playback of the file starts. An efficient streaming process in which a common streaming process such as setting, pause, resume, and stop can be started is provided, and search, fast forward, rewind, and a media stream adaptive process are provided.

Step S902: The client 91 sends an HTTP GET request to the server 92 to request a media segment within duration, where the requested segment may include an audio file and a video file, or may include only the audio file or the video file, and one request may request one or more media segments.

Step S903: The server 92 sends the corresponding media segment to the client 91. In a possible embodiment, when a media segment of a GET request does not include another media segment, a byte domain may not be used, or else, a byte domain needs to be used.

A seek operation may be performed on the client 91 in order to acquire a special media segment from the server 92. In this case, the client 91 sends to the server 92 a new GET request (step S904) based on a to-be-sought location, and the server 92 may determine, by analyzing a keyword in the GET request, that the seek in a buffer event occurs in order to trigger a change of a corresponding buffer status and determine that a terminal enters a re-buffering state.

Whether the seek in the buffer event occurs may be determined in a manner of comparing range values or begin values in consecutive GET requests (for example, requests in steps S904 and S906), or whether the seek in the buffer event occurs may be determined in a manner of comparing ts_start values and ts_end values in consecutive GET requests (for example, requests in steps S904 and S906).

Step S905 and step S907: The server 92 sends the corresponding media segment to the client 91.

For stream switch, the client 91 may acquire, from the MPD, enough information that is needed for performing the stream switch. For example, audio streams of different languages, video streams of different visual angles, and a combination of the foregoing audio and video streams are selected, and dynamic selection for same video content at different code rates may be further provided.

Step S908: The client 91 sends a GET request to the server 92.

Step S909: The server 92 sends the corresponding media segment to the client 91.

The client 91 does not send a GET request to the server 92 any more when an operation such as pause or play paused occurs on the client 91. The server may determine that the pause in the buffer event occurs on the client 91 when no new GET request from the client 91 is received within preset duration.

According to the technical solutions provided in this embodiment of the present disclosure, corresponding buffer status switching is triggered by means of determining a buffer event, which can accurately satisfy a buffer requirement of an existing media service such that a buffer model is closer to a real client buffer situation.

Figure 10:
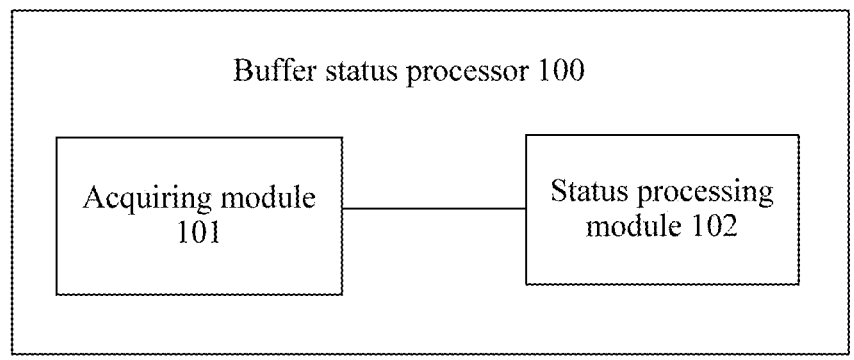
FIG. 10 is a schematic diagram of an HTTP-based buffer status processor according to an embodiment of the present disclosure.

The following describes a buffer status processor 100 according to an embodiment of the present disclosure with reference to FIG. 10. As shown in FIG. 10, the buffer status processor 100 includes an acquiring module 101 and a status processing module 102. The acquiring module 101 connects to the status processing module 102. A buffer event includes seek, pause, resume, and stream switch, and a buffer status includes a re-buffering state, a normal play state, a play paused state, and a stream switch state.

The acquiring module 101 is mainly configured to acquire a buffer event, and the status processing module 102 is configured to update a buffer status according to the buffer event obtained by the acquiring module 101, where the play paused state is entered when the buffer event is the pause, the normal play state is entered when the buffer event is the resume, the re-buffering state is entered when the buffer event is the seek, and the stream switch state is entered when the event is the stream switch.

According to the HTTP-based buffer status processor 100 in this embodiment of the present disclosure, corresponding buffer status switching is triggered by means of determining a buffer event, which can accurately satisfy a buffer requirement of an existing media service such that a buffer model is closer to a real client buffer situation.

It may be clearly understood by a person skilled in the art that, for the purpose of convenient and brief description, for a detailed working process of the foregoing modules and units, reference may be made to a corresponding process in the foregoing method embodiments, and details are not described herein.

In the several embodiments provided in this application, it should be understood that the disclosed processor, device, and method may be implemented in other manners. For example, the described device embodiments are merely exemplary. For example, the module and unit division is merely logical function division and may be other division in actual implementation. For example, a plurality of units or components may be combined or integrated into another system, or some features may be ignored or not performed.

In addition, the displayed or discussed mutual couplings or direct couplings or communication connections may be implemented using some interfaces. The indirect couplings or communication connections between the apparatuses or units may be implemented in electronic, mechanical, or other forms.

In addition, functional modules and units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely exemplary implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A Hypertext Transfer Protocol (HTTP)-based buffer status updating method, comprising:
   receiving an HTTP request from a terminal;
   triggering a buffer event according to the HTTP request, wherein the buffer event comprises seek, pause, resume, and stream switch; and
   updating a buffer status according to the buffer event, wherein the buffer status comprises a normal play state, a play paused state, a re-buffering state, and a stream switch state,
   wherein receiving the HTTP request from the terminal, and wherein triggering the buffer event according to the HTTP request comprises:
   receiving a current HTTP GET request from the terminal, wherein a time at which the current GET request is received is t; and
   triggering the pause when a next HTTP GET request from the terminal is not received within a preset duration that starts from t, and
   wherein updating the buffer status according to the buffer event comprises setting the buffer status to the play paused state according to the pause.

2. The buffer status updating method according to claim 1, wherein after triggering the pause, the method further comprises:
   triggering the resume according to the next HTTP GET request when the next HTTP GET request from the terminal is received; and
   setting the buffer status to the normal play state according to the resume when the next HTTP GET request from the terminal is received.

3. The buffer status updating method according to claim 2, wherein the current HTTP GET request comprises a current stream indicator, wherein the next HTTP GET request comprises a next stream indicator, wherein when the current stream indicator is different from the next stream indicator, and wherein after the next HTTP GET request from the terminal is received, the method further comprises:
triggering the stream switch; and
setting the buffer status to the stream switch state according to the stream switch.

4. The buffer status updating method according to claim 1, further comprising:
determining, according to a keyword in the current HTTP GET request, whether to trigger the seek; and
setting the buffer status to the re-buffering state according to the seek when it is determined to trigger the seek.

5. The buffer status updating method according to claim 4, wherein determining, according to the keyword in the current HTTP GET request, whether to trigger the seek comprises triggering the seek when a difference between a rang value in the current HTTP GET request and a range value in a previous HTTP GET request from the terminal is greater than a preset threshold.

6. The buffer status updating method according to claim 4, wherein determining, according to the keyword in the current HTTP GET request, whether to trigger the seek comprises triggering the seek when a first difference between a ts_start value in the current HTTP GET request and a ts_start value in a previous HTTP GET request from the terminal is greater than a preset threshold and a second difference between a ts_end value in the current HTTP GET request and a ts_end value in the previous HTTP GET request from the terminal is greater than the preset threshold.

7. The buffer status updating method according to claim 4, wherein determining, according to the keyword in the current HTTP GET request, whether to trigger the seek comprises triggering the seek when a difference between a begin value in the current HTTP GET request and a begin value in a previous HTTP GET request from the terminal is greater than a preset threshold.

8. The buffer status updating method according to claim 1, wherein receiving the HTTP request from the terminal, and wherein triggering the buffer event according to the HTTP request comprises:
receiving a first HTTP GET request from the terminal; and
triggering the seek according to a keyword in the first HTTP GET request, and
wherein updating the buffer status according to the buffer event comprises setting the buffer status to the re-buffering state according to the seek.

9. The buffer status updating method according to claim 1, wherein receiving the HTTP request from the terminal, and wherein triggering the buffer event according to the HTTP request comprises:
receiving a second HTTP GET request from the terminal; and
triggering the resume according to the second HTTP GET request, and
wherein updating the buffer status according to the buffer event comprises setting the buffer status to the normal play state according to the resume.

10. The buffer status updating method according to claim 1, wherein receiving the HTTP request from the terminal, and triggering the buffer event according to the HTTP request comprises:

receiving a third HTTP GET request from the terminal, wherein the third HTTP GET request comprises a stream indicator; and
triggering the stream switch when the stream indicator is different from a previous stream indicator from the terminal, and
wherein updating the buffer status according to the buffer event comprises setting the buffer status to the stream switch state according to the stream switch.

11. A Hypertext Transfer Protocol (HTTP)-based buffer status updating device, comprising:
a receiver configured to receive an HTTP request from a terminal;
a processor coupled to the receiver; and
a non-transitory computer-readable storage medium coupled to the processor and configured to store programming instructions for execution by the processor, wherein the programming instructions instruct the processor to:
trigger a buffer event according to the HTTP request; and
update a buffer status according to the buffer event, wherein the buffer event comprises seek, pause, resume, and stream switch, and wherein the buffer status comprises a normal play state, a play paused state, a re-buffering state, and a stream switch state,
wherein the receiver is further configured to receive a current HTTP GET request from the terminal, wherein a time at which the current HTTP GET request is received is t, and wherein the programming instructions further instruct the processor to:
trigger the pause when a next HTTP GET request from the terminal is not received within a preset duration that starts from t; and
set the buffer status to the play paused state according to the pause.

12. The buffer status updating device according to claim 11, wherein the receiver is further configured to receive the next HTTP GET request, and wherein the programming instructions further instruct the processor to:
trigger the resume according to the next HTTP GET request; and
set the buffer status to the normal play state according to the resume.

13. The buffer status updating device according to claim 11, wherein the programming instructions further instruct the processor to:
trigger the stream switch; and
set the buffer status to the stream switch state according to the stream switch.

14. The buffer status updating device according to claim 11, wherein the programming instructions further instruct the processor to:
trigger the seek according to a keyword in the current HTTP GET request; and
set the buffer status to the re-buffering state according to the seek.

15. The buffer status updating device according to claim 11, wherein the receiver is further configured to receive a fourth HTTP GET request from the terminal, and wherein the programming instructions further instruct the processor to:
trigger the seek according to a keyword in the fourth HTTP GET request; and
set the buffer status to the re-buffering state according to the seek.

16. The buffer status updating device according to claim 11, wherein the receiver is further configured to receive a fifth HTTP GET request from the terminal, and wherein the programming instructions further instruct the processor to:
  trigger the resume according to the fifth HTTP GET request; and
  set the buffer status to the normal play state according to the resume.

17. The buffer status updating device according to claim 11, wherein the receiver is further configured to receive a sixth HTTP GET request from the terminal, wherein the sixth HTTP GET request comprises a stream indicator, and wherein the programming instructions further instruct the processor to:
  trigger the stream switch according to the stream indicator; and
  set the buffer status to the stream switch state according to the stream switch.

* * * * *